Oct. 17, 1933. O. BARNACK 1,931,313
COUPLING BETWEEN OBJECTIVE ADJUSTMENT AND DISTANCE GAUGE IN CAMERAS
Filed Jan. 6, 1932
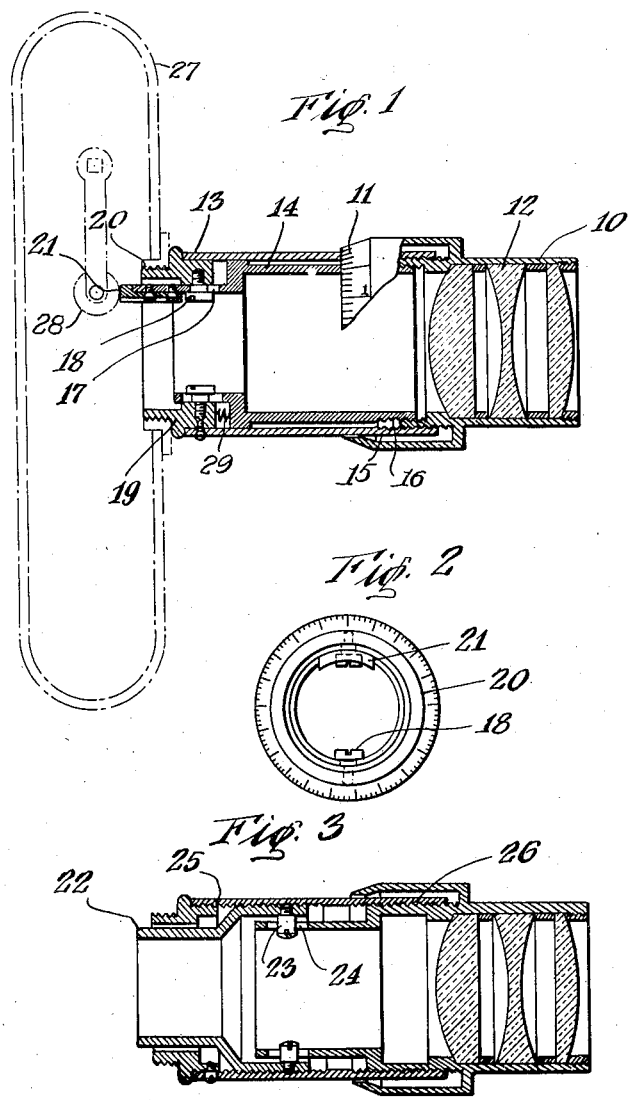
INVENTOR
Oskar Barnack
BY
[signature]
ATTORNEY Patented Oct. 17, 1933

1,931,313

UNITED STATES PATENT OFFICE 1,931,313

COUPLING BETWEEN OBJECTIVE ADJUSTMENT AND DISTANCE GAUGE IN CAMERAS

Oskar Barnack, Wetzlar, Germany, assignor to Ernst Leitz Optische Werke, Wetzlar, Germany Application January 6, 1932, Serial No. 584,968, and in Germany January 7, 1931

3 Claims. (Cl. 95—44)

This invention relates to improvements in photographic and cinematographic cameras in which the regulation of the objective is effected simultaneously with the adjustment of a distance gauge.

In the known apparatus of this type it is necessary to exchange the distance scale commensurate with the change in objectives, or it is necessary to use a distancing gauge with a specially devised scale.

It has frequently happened that the operator forgot to make this change resulting in a great waste of material, time, and labor.

It is the object of my invention to obviate this disadvantage by providing a device or apparatus in which the adjustment of the objectives controls simultaneously the distance gauge.

With this end in view, I provide a tubular member for controlling the adjustment of the distancing gauge which has an inner threaded part in which is guided an intermediary threaded member and which is secured against rotation by means of a screw bolt, secured in the outer stationary housing, displaceable in a longitudinal slot or groove parallel to the optical axis of the intermediary member.

In the modified form of my invention the main frame for the objectives is provided with two inner threads, one of which, the front one, is coupled to the element controlling the distance gauge for the objective, while the other, the rear one, is connected with the threaded front part by means of a stationary bolt guided in a longitudinal groove to participate in the rotation of the front member.

These and other objects and advantages of my invention will become more fully known as the description thereof proceeds, and will then be specifically defined in the appended claims.

In the accompanying drawing, forming a material part of this disclosure:

Fig. 1 is a sectional elevation of an objective mount constructed according to my invention.

Fig. 2 is a rear end view thereof.

Fig. 3 is a view similar to Figure 1, of a modified form of my invention.

As illustrated, the frame or setting 10 of an objective, is equipped with a meter scale 11. A system of objective lenses 12 within the setting 10 serves as medium for taking pictures. An outer tubular member 13 surrounds an inner member 14. The setting 10 for the objective is equipped with two threads 15, 16, providing a connection between the members 13 and 14. The inner member 14 is provided at its reduced end with a slot 17 in which a screw 18 of an extension 19 is guided which has an external thread 20 by means of which it is screwed into a socket of a camera 27, shown in broken lines in Figure 1.

A projection 21 having preferably a beveled or curved end face controls the lever 28 of a distancing gauge within camera 27.

In the modified form of my invention, illustrated in Figure 3, the inner tubular stem 22 preferably having its outer end beveled or curved is used for controlling the distancing gauge, and this inner tubular stem is guided by means of the screw 23 displaceable in slot 24 having a width commensurate to the pitch of the threaded parts 25 and 26. A spring 29 is provided in Figure 1 to avoid idle motion of part 16.

The operation of my device will be entirely clear from the above description and by reference to the drawing.

It will be clear that the lever 28 of the distance meter is so arranged within the camera that projection 21 or stem 22 during the adjustment of the objective can operate the lever 28 of the distance meter for the adjustment of a reflection mirror in the meter.

The threaded parts 15 and 16 serve to adjust the distance meter and the objective and have oppositely disposed pitch so that upon movement of the objective 12 and its setting to the right, the projecting part 21 and the inner member 14 are moved towards the left in Figure 1.

In Figure 3 the threaded parts 25 and 26 have also oppositely disposed pitch. The tubular stem 22 operates the lever of the distance meter and projects into the camera in the same way as projection 21, Figure 1.

In order to obtain a sharp focal adjustment of the objective, the same must be moved away from the camera while the lever of the distance meter is moved backward, and for this purpose the threaded parts 15 and 16 or 25 and 26 must have different pitch. The screw 23 enables a relative parallel adjustment of both parts so that the objective is not turning about its axis. In order to provide ample space for the parallel displacement the slot 24 within the inner tubular stem is provided.

In Figure 1 projection 21 is secured by means of two screws 18 to the inner tubular stem in order to enable an exchange of part 21 against another part.

The spring 29 in Figure 1 serves the purpose of preventing idle motion in the threaded part 16.

It will be understood that I have disclosed the preferred forms of my invention only as some examples of the many possible ways to practically construct my device and that I may make such changes in its general arrangement and the construction of its minor details as come within the scope of the appended claims without departure from the spirit of my invention and the principles involved.

Having thus described my invention, what I claim as new and desire to secure by Letters Patent is:

1. In a device of the class described, a tubular main objective frame having in its interior two threaded parts of varying pitch, an inner slotted member coupled with the objective adjusting means, an outer member coupled to the inner member, a bolt engaging in the slot of said inner member to be guided in a longitudinal direction, and a projection on said inner member controlling the lever of a distance gauge within the camera for the simultaneous adjustment of objective and distance gauge.

2. In a device of the class described, a coupling between objective and distance indicating gauge, comprising an intermediary member, an extension on the outer end of said member adapted to be adjusted in the direction of its longitudinal axis and to control the lever transmission of the distance gauge.

3. In a camera including its objective and distance meter, a setting for the objective provided with two threads of varying pitch, an outer and an inner slotted tubular member engaged with said threads, an extension on said outer member, a screw on said extension of the outer member engaging the slot in said inner member for allowing a relative parallel adjustment of both members but preventing a turning of the objective about its axis, a projecting part having a beveled end engaging the lever of the distance meter, for the relative control of the distance gauge simultaneously with the adjustment of the objective.

OSKAR BARNACK.

DISCLAIMER 1,931,313.—*Oskar Barnack*, Wetzlar, Germany. COUPLING BETWEEN OBJECTIVE ADJUSTMENT AND DISTANCE GAUGE IN CAMERAS. Patent dated October 17, 1933. Disclaimer filed May 19, 1938, by the assignee, *Ernst Leitz, G. m. b. H.*

Hereby enters this disclaimer to that part of the specification which is in the following words, to wit: "so that the objective is not turning about its axis", page 1, lines 99–100. And to that part of claim 3 in said patent which is in the following words, to wit: "but preventing a turning of the objective about its axis", page 2, lines 91–92.

[*Official Gazette June 14, 1938.*]